United States Patent
Tsuda et al.

(10) Patent No.: US 9,034,973 B2
(45) Date of Patent: May 19, 2015

(54) COMPOSITION FOR FORMING INTERMEDIATE FILM FOR LAMINATED GLASS, INTERMEDIATE FILM FOR LAMINATED GLASS AND LAMINATED GLASS

(75) Inventors: Takashi Tsuda, Kanagawa (JP); Makiko Shimada, Kanagawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1249 days.

(21) Appl. No.: 12/305,257

(22) PCT Filed: Jun. 15, 2007

(86) PCT No.: PCT/JP2007/062122
§ 371 (c)(1),
(2), (4) Date: Dec. 17, 2008

(87) PCT Pub. No.: WO2007/148624
PCT Pub. Date: Dec. 27, 2007

(65) Prior Publication Data
US 2010/0009205 A1 Jan. 14, 2010

(30) Foreign Application Priority Data
Jun. 19, 2006 (JP) ................. 2006-168614

(51) Int. Cl.
| | |
|---|---|
| *C08F 257/02* | (2006.01) |
| *C08L 31/00* | (2006.01) |
| *C08L 33/00* | (2006.01) |
| *C08L 51/00* | (2006.01) |
| *C08L 51/06* | (2006.01) |
| *B32B 17/10* | (2006.01) |
| *C08G 65/332* | (2006.01) |
| *C08K 5/00* | (2006.01) |
| *C08L 23/08* | (2006.01) |
| *C08L 71/02* | (2006.01) |
| *C09J 123/08* | (2006.01) |
| *C09J 171/02* | (2006.01) |
| *C08K 5/103* | (2006.01) |

(52) U.S. Cl.
CPC ........... *C08L 51/06* (2013.01); *B32B 17/10788* (2013.01); *C08G 65/3322* (2013.01); *C08K 5/0025* (2013.01); *C08K 5/103* (2013.01); *C08L 23/0853* (2013.01); *C08L 71/02* (2013.01); *C09J 123/0853* (2013.01); *C09J 171/02* (2013.01)

(58) Field of Classification Search
CPC B32B 17/10; B32B 17/10788; C08K 5/0025; C08L 23/0853; C09J 123/0853; C09J 171/02
USPC ............. 428/442; 524/533, 529; 525/55, 242, 525/303
See application file for complete search history.

(56) References Cited

U.S. PATENT DOCUMENTS

| | | | |
|---|---|---|---|
| 3,666,614 A | 5/1972 | Snedeker | |
| 4,012,559 A * | 3/1977 | Fujioka et al. | ................ 428/463 |
| 5,673,251 A * | 9/1997 | Suzuki et al. | .............. 369/275.4 |
| 2002/0034492 A1* | 3/2002 | Munro et al. | .............. 424/78.36 |
| 2003/0111159 A1 | 6/2003 | Hashimoto | |

FOREIGN PATENT DOCUMENTS

| | | |
|---|---|---|
| CN | 1142437 A | 2/1997 |
| EP | 0747210 A2 | 12/1996 |
| EP | 1666559 | 6/2006 |
| EP | 1734092 | 12/2006 |
| EP | 1 785 404 A1 | 5/2007 |
| JP | 57034930 * | 2/1982 |
| JP | 57-196747 A | 12/1982 |
| JP | 61-263640 A | 11/1986 |
| JP | 63-125561 A | 5/1988 |
| JP | 09-110481 | 4/1997 |
| JP | 09-188548 | 7/1997 |
| JP | 2005-1952 A | 1/2005 |
| JP | 2005-213068 A | 8/2005 |
| WO | 2006/004162 A1 | 1/2006 |

OTHER PUBLICATIONS

European Communication for EP Application No. 07745377, dated Feb. 14, 2012, including Supplementary European Search Report dated Feb. 3, 2012.

* cited by examiner

*Primary Examiner* — Fred M Teskin
*Assistant Examiner* — Marie Reddick
(74) *Attorney, Agent, or Firm* — Sughrue Mion, PLLC

(57) ABSTRACT

The object of the present invention is to provide an intermediate film for laminated glass which prevents reductions of transparency and appearance property caused by permeation of moisture and water. The above object is attained by the present invention, i.e., a composition for forming an intermediate film for a laminated glass which comprises ethylene-vinyl acetate copolymer and a compound having alkyleneoxy group. The composition of the present invention enables the formation of an intermediate film for a laminated glass that restrains white spots from occurring by the permeation of moisture and water.

11 Claims, No Drawings

COMPOSITION FOR FORMING INTERMEDIATE FILM FOR LAMINATED GLASS, INTERMEDIATE FILM FOR LAMINATED GLASS AND LAMINATED GLASS

BACKGROUND OF INVENTION

1. Field of the Invention

The present invention relates to a composition for forming an intermediate film, which is suitably used for the intermediate film for a laminated glass comprising ethylene vinyl acetate copolymer as a major component.

2. Description of the Related Art

A laminated glass having a structure that two sheets of glass are bonded through a transparent adhesive layer (intermediate film) is known. The use of the intermediate film enhances penetration resistance of the laminated glass. Even if the laminated glass for automobile is destroyed for the purpose of robbery or invasion, the window of the laminated glass cannot be opened. If external impact is given to the laminated glass, the transparent adhesive layer prevents the glass broken by the impact from scattering, because the layer adheres to pieces of the broken glass.

The laminated glass is used as a front glass and a side glass of airplane and vehicle, window glass of building, in addition to office automation equipment, office machinery and electronic device. Therefore, the laminated glass is required to have excellent transparency and appearance property, in addition to the penetration resistance and safety such as a prevention of scattering of broken glass.

However, the laminated glass has a problem that the appearance property and the transparency of it are reduced depending on use condition. Since a permeation of moisture and water at high temperature may form white spots in the intermediate film over time, the appearance property and the transparency of the laminated glass are reduced.

Polyvinyl butyral (hereinafter called "PVB") is used for the intermediate film of laminated glass. However, the polyvinyl butyral which is thermoplastic resin is apt to be affected by the moisture. If an intermediate film comprising the polyvinyl butyral is left under high-humidity atmosphere for a long time, the transparent substrate is apt to detach from the intermediate film and white discoloration is apt to occur in the periphery of the intermediate film. As mentioned above, the water resistance of PVB is reduced. Therefore, Document 1 proposes a intermediate film which comprises an ethylene-vinyl acetate copolymer (hereinafter called "EVA") having the excellent water resistance, and a laminated glass having a structure that two sheets of glass are bonded through the intermediate film.

The conventional intermediate film comprising EVA can be formed by subjecting a composition including EVA and a cross-linking agent to a molding process, for example by heat rolling using extrusion molding and the like. In addition, in order to enhance the gelation fraction and durability of EVA, cross-linking auxiliaries such as triallyl cyanurate and triallyl isocyanurate may be added to the composition to form the intermediate film (Document 2).

[Document 1] JP1982-196747 A
[Document 2] JP2005-001952 A

SUMMARY OF THE INVENTION

The white spots still may be formed in the conventional laminated glass which includes the intermediate film comprising EVA. Therefore, the laminated glass is required to maintain the excellent transparency and the appearance property under any use conditions such as high temperature and high humidity environment.

Hence, the object of the present invention is to provide an intermediate film for laminated glass which prevents reductions of transparency and appearance property caused by permeation of moisture and water.

The present inventors have eagerly studied in view of aforementioned problems, and consequently found out that the problems can be resolved by forming the intermediate film combining EVA with a compound having an alkyleneoxy group.

Therefore, the above object is attained by the present invention, i.e., a composition for forming an intermediate film for a laminated glass which comprises an ethylene-vinyl acetate copolymer and the compound having an alkyleneoxy group.

The preferred embodiments of the present invention are set forth below.

(1) The compound having an alkyleneoxy group has the following formula (1);

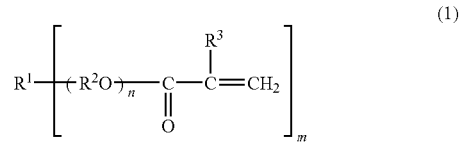

in which $R^2$ represents a substituted or unsubstituted alkylene group, $R^3$ represents a hydrogen atom or a methyl group, n is an integer of from 2 to 30, m is an integer of from 1 to 3, when m is 1, $R^1$ is a hydroxyl group, an alkoxyl group, an aryloxy group, an acryloyloxy group or a methacryloyloxy group, when m is 2, $R^1$ is a divalent aliphatic hydrocarbon group, and when m is 3, $R^1$ is a trivalent aliphatic hydrocarbon group.

(2) The compound having an alkyleneoxy group is methoxypolyethylene glycol(meth)acrylate (n=4 to 15).

(3) The compound having an alkyleneoxy group is contained in the amount of from 0.01 to 5 parts by weight based on 100 parts by weight of the ethylene-vinyl acetate copolymer. In case the compound is used in this range, the intermediate film for laminated glass that a bleed phenomenon and a blocking phenomenon in addition to the reduction of transparency and appearance property are scarcely generated can be formed.

(4) The composition for forming an intermediate film for a laminated glass further comprises 2-hydroxyethyl acrylate. This composition enables the formation of the intermediate film for laminated glass that the excellent transparency and the adhesion are maintained for a long time.

(5) The amount of the 2-hydroxyethyl acrylate is from 0.01 to 5 parts by weight based on 100 parts by weight of the ethylene-vinyl acetate copolymer.

Effect of the Invention

The composition for forming an intermediate film for a laminated glass according to the present invention enables the formation of the intermediate film for a laminated glass that restrains white spots from occurring by the permeation of moisture and water. The intermediate film brings about the laminated glass which maintains excellent transparency and appearance property under extremely sever environment such as a high humidity environment, outdoor environment exposed to wind and weather.

DETAILED DESCRIPTION OF THE INVENTION

The composition for forming an intermediate film for a laminated glass according to the present invention is characterized by combining an ethylene-vinyl acetate copolymer with the compound having an alkyleneoxy group. The compound having an alkyleneoxy group prevents the occurrence of the white spots in the intermediate film for a laminated glass by the permeation of moisture and water. Although the mechanism of the effect is unclear, it would appear that the moisture does not affect the main chain of EVA, because the alkyleneoxy group can catch the moisture which permeates the intermediate film for a laminated glass.

In addition, the intermediate film for laminated glass formed by using the composition of the invention can prevent the occurrence of the white spots without reducing the properties required for the intermediate film such as excellent transparency, excellent adhesion to a transparent substrate and penetration resistance.

Hence, the composition of the present invention enables formation of the intermediate film for laminated glass which prevents occurrence of the white spots, and maintains the excellent transparency and the appearance property for a long time under extremely sever environment such as a high humidity environment, outdoor environment exposed to wind and weather without reducing the properties required for the intermediate film.

The composition for forming an intermediate film for a laminated glass according to the invention is explained in detail below.

[The Compound Having an Alkyleneoxy Group]

The composition of the present invention comprises the compound having at least one of an alkyleneoxy group. There are no particular limitations on the compounds having an alkyleneoxy group and any ordinary compounds may be used.

Preferred examples of the compound having an alkylenoxy group include compounds having a formula (1);

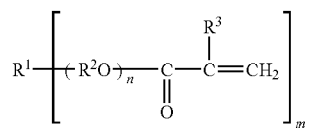
(1)

in which $R^2$ represents a substituted or unsubstituted alkylene group, $R^3$ represents a hydrogen atom or a methyl group, n is an integer of from 2 to 30, m is an integer of from 1 to 3, $R^1$ is a hydroxyl group, an alkoxyl group, an aryloxy group, an acryloyloxy group or a methacryloyloxy group when m is 1, $R^1$ is a divalent aliphatic hydrocarbon group when m is 2, and $R^1$ is a trivalent aliphatic hydrocarbon group when m is 3.

The $R^2$ of formula (1) is a substituted or unsubstituted alkylene group as mentioned above. The $R^2$ is preferably the substituted or unsubstituted alkylene group having 1 to 40 carbon atoms, preferably 1 to 30 carbon atoms, in particular 1 to 15 carbon atoms. Examples of the $R^2$ include a methylene group, an ethylene group, a trimethylene group, a tetramethylene group, a propylene group, a butylene group, a hexamethylene group, an octamethylene group, a decamethylene group, an undecamethylene group, a dodecamethylene group, a tridecamethylene group, a tetradecamethylene group, a pentadecamethylene group, a hexadecamethylene group, a heptadecamethylene group and an octadecamethylene group.

The substituent group of the substituted alkylene group is preferably alkyl group having 1 to 10 carbon atoms. Examples of the substituent group include a methyl group, an ethyl group, a propyl group, an isopropyl group, a butyl group, a tert-butyl group, a pentyl group, a neopentyl group and a hexyl group.

In particular, the $R^2$ is preferably an ethylene group or —$CH_2CH(CH_3)$—. These groups do not have a harmful influence on the main chain of EVA to bring about the intermediate film having excellent adhesion to the transparent substrate, excellent transparency and excellent penetration resistance.

In the formula (1), n is an average mole number of added ethyleneoxide and an integer of from 2 to 30. The n is preferably an integer of from 2 to 20, more preferably an integer of from 4 to 15. The compound having n in this range prevents occurrence of the blocking, the blocking meaning that the intermediate film adheres tightly to each other in the wound intermediate film, whereby the intermediate film having excellent transparency can be obtained.

In the formula (1), m is an integer of from 1 to 3. When m is 1, $R^1$ is a hydroxyl group, an alkoxyl group, an aryloxy group, an acryloyloxy group or a methacryloyloxy group.

The alkoxyl group of $R^1$ is preferably an alkoxyl group having 1 to 10 carbon atoms. Examples of the alkoxyl group include an ethoxy group, a methoxy group, a propoxy group, a butoxy group and an isooctyloxy group. Of them, the ethoxy group and the phenoxy group are particularly preferred. These alkoxyl groups may have hydroxyl group.

The aryloxy group of $R^1$ is preferably an aryloxy group having 6 to 20 carbon atoms. Examples of the aryloxy group include a phenoxy group, a benzyloxy group and a naphthoxy group. Of them, phenoxy group is particularly preferred. These aryloxy groups may have hydroxyl group.

The $R^1$ is preferably the alkoxyl group having 1 to 10 carbon atoms or the aryloxy group having 6 to 20 carbon atoms, in particular the ethoxy group, the methoxy group and the phenoxy group. The use of the compound having these groups enables the preparations of the adhesive layer having excellent transparency and adhesion.

On the other hand, when n is 2 in the formula (1), $R^1$ is a divalent aliphatic hydrocarbon group. The divalent aliphatic hydrocarbon group is preferably a linear or unbranched alkylene group. Examples of the divalent aliphatic hydrocarbon group include a methylene group, an ethylene group, an ethylidene group, a trimethylene group, a propylene group (1,2-propanediyl group), an isopropylidene group, a tetramethylene group, an ethylethylene group, a pentamethylene group, a hexamethylene group, a heptamethylene group and an octamethylene group.

The divalent aliphatic hydrocarbon group may be substituted by 1 to 4 substituent groups. The substituent group is preferably the alkyl group having 1 to 6 carbon atoms or the hydroxyl group.

When m is 3 in the formula (1), the $R^1$ is a trivalent aliphatic hydrocarbon group. The trivalent aliphatic hydrocarbon group is preferably the group of the following formula (2):

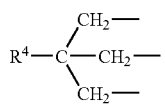

in which $R^4$ is a hydrogen atom, a hydroxyl group, an alkyl group having 1 to 4 carbon atoms or a hydroxyl alkyl group having 1 to 4 carbon atoms.

In addition, the trivalent aliphatic hydrocarbon group is preferably the group of the following formula (3):

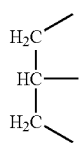

In a preferred embodiment, m is 1 and $R^1$ is the alkoxyl group having 1 to 10 carbon atoms or the aryloxy group having 6 to 20 carbon atoms in the formula (1). In the preferred embodiment, the compound can form the intermediate film having excellent adhesion to a transparent substrate, excellent transparency and excellent penetration resistance without a harmful influence on the main chain of EVA.

The examples of the compound having an alkyleneoxy group of the formula (1) include butoxyethyl(meth)acrylate, propoxyethyl(meth)acrylate, ethoxybutyl(meth)acrylate, phenoxy polyethyleneglycolmono(meth)acrylate, methoxy polyethyleneglycol(meth)acrylate, polyethyleneglycol diacrylate, polyethyleneglycol dimethacrylate, butoxyethyl acrylate and tolypropyleneglycol diacrylate. These compounds can be used singly, or in combination of two more kinds.

Of them, methoxy polyethyleneglycol(meth)acrylate (the average mole number of added ethyleneoxide n=4 to 15), in particular methoxy nonaethyleneglycol acrylate as the compounds having an alkyleneoxy group is preferably used, since the intermediate film for laminated glass having excellent transparency and adhesion to the transparent substrate can be obtained.

In the composition of the present invention, the amount of the compound having an alkyleneoxy group is preferably is in the range of from 0.01 to 5 parts by weight, more preferably from 0.1 to 0.6 parts by weight, in particularly from 0.2 to 0.5 parts by weight based on 100 parts by weight of the ethylene-vinyl acetate copolymer. The use of the compound in the amount of not more than 5 parts by weight enables prevention of the blocking phenomenon and the bleed phenomenon, which means that the compounds having an alkyleneoxy group bleed on the surface of the intermediate film with time and then the appearance property of the intermediate film is reduced. The use of the compound in the amount of not less than 0.01 parts by weight sufficiently bring about the effects caused by the compounds.

The composition for forming an intermediate film for a laminated glass of the present invention comprises preferably 2-hydroxyethyl acrylate and the compound having an alkyleneoxy group. The intermediate film for laminated glass comprising the 2-hydroxyethyl acrylate is capable of maintaining excellent transparency and excellent adhesion to the transparent substrate for a long time.

In the composition of the present invention, the amount of the 2-hydroxyethyl acrylate is preferably in the range of from 0.01 to 5 parts by weight, more preferably from 0.1 to 0.6 parts by weight, in particular from 0.2 to 0.5 parts by weight based on 100 parts by weight of the ethylene-vinyl acetate copolymer. In case the amount is in the range, the intermediate film for laminated glass is capable of maintaining excellent transparency and excellent adhesion to the transparent substrate for a long time.

[Ethylene-Vinyl Acetate Copolymer]

The composition of the present invention comprises the ethylene-vinyl acetate copolymer and the compound having an alkyleneoxy group. Further, polyvinyl acetal resin (e.g., polyvinyl formal, polyvinyl butyral (PVB), modified PVB) and/or polyvinyl chloride can be secondarily used. PVB is preferred.

In the composition of the present invention, the content of vinyl acetate recurring unit in the ethylene-vinyl acetate copolymer preferably is in the range of 20 to 35 parts by weight, in particularly 24 to 28 parts by weight based on 100 parts by weight of the ethylene-vinyl acetate copolymer. If the content of vinyl acetate recurring unit is less than 20 parts by weight, the transparency of the intermediate film for laminated glass is apt to be reduced after the cross-linking and curing stage at the high temperature. If the content of vinyl acetate recurring unit is more than 35 parts by weight, a generation of acetic acid is apt to accelerate the deterioration of the intermediate film.

[Cross-Linking Agent]

The composition of the present invention comprises preferably a cross-linking agent in addition to the ethylene-vinyl acetate copolymer and the compound having an alkyleneoxy group.

The cross-linking agent which can be used for the composition is organic peroxide or photopolymerization initiator. Of them, the organic peroxide is preferred, because the intermediate film having the improved adhesion, transparency, humidity resistance and penetration resistance can be prepared, As the organic peroxide, any materials that can be decomposed at a temperature of not less than 100° C. to generate radical(s) can be employed. The organic peroxide is selected in the consideration of film-forming temperature, condition for preparing the composition, curing (bonding) temperature, heat resistance of body to be bonded, storage stability. Especially, preferred are those having a decomposition temperature of not less than 70° C. in a half-life of 10 hours.

From the viewpoint of resin processing temperature and storage stability, examples of the organic peroxides include benzoyl peroxide-type cure agent, tert-hexyl peroxypyvalate, tert-butyl peroxypyvalate, 3,5,5-trimethyl hexanoyl peroxide, di-n-octanoyl peroxide, lauroyl peroxide, stearoyl peroxide, 1,1,3,3-tetramethylbutylperoxy-2-ethyl hexanoate, succinic acid peroxide, 2,5-dimethyl-2,5-di(2-ethylhexanoylperoxy)hexane, 1-cyclohexyl-1-methylethylperoxy-2-ethyl hexanoate, tert-hexylperoxy-2-ethyl hexanoate, 4-methylbenzoyl peroxide, tert-butylperoxy-2-ethyl hexanoate, m-toluoyl+benzoyl peroxide, benzoyl peroxide, 1,1-bis(tert-butylperoxy)-2-methylcyclohexanate, 1,1-bis(tert-hexylperoxy)-3,3,5-trimethylcyclohexanate, 1,1-bis(tert-hexylperoxy)cyclohexanate, 1,1-bis(tert-butylperoxy)-3,3,5-trimethylcyclohexanate, 2,2-bis(4,4-di-tert-butylperoxycyclohexyl)propane, 1,1-bis(tert-butylperoxy)cyclododecane, tert-hexylperoxyisopropyl monocarbonate, tert-butylperoxy maleic acid, tert-butylperoxy-3,3,5-trimethyl hexanoate, tert-butyl peroxylaurate, 2,5-dimethyl-2,5-di(methylbenzoylperoxy)hexane, tert-butylperoxyisopropyl monocarbonate, tert-butylperoxy-2-ethylhexyl monocarbonate, tert-hexyl peroxybenzoate and 2,5-di-methyl-2,5-di(benzolyperoxy)hexane.

As the benzoyl peroxide-type cure agents, any materials that can be decomposed at a temperature of not less than 70° C. to generate radical(s) can be employed. The benzoyl peroxide-type cure agent is selected in the consideration of film-forming temperature, condition for preparing the composition, curing (bonding) temperature, heat resistance of body to be bonded, storage stability. Examples of the benzoyl peroxide-type cure agents include benzoyl peroxide, 2,5-dimethyl-hexyl-2,5-bisperoxybenzoate, p-chlorobenzoyl peroxide, m-toluoyl peroxide, 2,4-dichlorobenzoyl peroxide, t-butyl peroxybenzoate and the like. The benzoyl peroxide-type cure agents can be each used singly, or in combination of two more kinds.

The content of the cross-linking agent in the composition preferably is in the range of 0.1 to 2 parts by weight, more preferably 0.2 to 1.5 parts by weight based on 100 parts by weight of EVA. If the content of the organic peroxide is low, the transparency of the intermediate film is apt to be reduced. If the content of the organic peroxide is excessive, the compatibility of the cross-linking agent with the copolymer is apt to be reduced.

As the photopolymerization initiator which can be used as the cross-linking agent, although any known materials can be employed, the photopolymerization initiator having the excellent storage stability after combining components is preferred. Examples of the photopolymerization initiator include acetophenone type such as 2-hydroxy-2-methyl-1-phenylpropane-1-one, and 1-hydroxycyclohexylphenylketone, 2-methyl-1-(4-(methylthio)phenyl)-2-morpholinopropane-1, benzoin type such as benzildimethylketal; benzophenon type such as benzophenon, 4-phenylbenzophenon and hydroxybenzophenon; thioxanthone type such as isopropylthioxanthone and 2,4-diethylthioxanthone; and other special initiator such as methylphenylglyoxylate. 2-hydroxy-2-methyl-1-phenylpropane-1-on, 1-hydroxycyclohexylphenylketone, 2-methyl-1-(4-(methylthio)phenyl)-2-morpholinopropane-1 and benzophenone are particularly preferred. These photopolymerization initiators can be used in combination with one or more photopolymerization promoters at an arbitrary ratio, if necessary. Examples of the photopolymerization promoter include benzoic acid type such as 4-dimethylamino benzoate and tertiary amine type. On the other hand, the only photopolymerization initiator can be each used singly, or in combination of two more kinds.

In the composition, the content of the photopolymerization initiator is preferably from 0.5 to 5.0 parts by weight based on 100 parts by weight of EVA.

[Cross-Linking Auxiliary Agent]

The composition of the present invention may comprise a cross-linking auxiliary agent, if necessary. The cross-linking auxiliary agent can be added to the composition in order to enhance the gelation fraction of EVA and the durability. Examples of the cross-linking auxiliary (compounds having a radical polymerizable group as functional group) include trifunctional cross-linking auxiliaries such as triallyl cyanurate and triallyl isocyanurate, monofunctional or bifunctional cross-linking auxiliaries of (meth)acryl esters (e.g., NK Ester, etc.). Triallyl cyanurate and triallyl isocyanurate are preferred, and triallyl isocyanurate is particularly preferred. The content of the cross-linking auxiliary generally is not more than 10 parts by weight, preferably in the range of 0.1 to 5 parts by weight based on 100 parts by weight of EVA.

[Others]

The composition may contain various additives such as acid acceptor, plasticizer and adhesion improver for improvement or adjustment of various properties of the film (e.g., mechanical strength, adhesive property (adhesion), optical characteristics such as transparency, heat resistance, light-resistance, cross-linking rate).

As the acid acceptor, metal oxide, metal hydroxide, metal carbonate and combined metal hydroxide can be used. These acid acceptors can be selected depending on the amount of acetic acid and the use application. Examples of the acid acceptor include oxide, hydroxide, carbonate, carboxylate, silicate, borate, hypophosphite and metaborate of metal of 2 group of periodic table such as magnesium oxide, calcium oxide, magnesium hydroxide, calcium hydroxide, barium hydroxide, magnesium carbonate, barium carbonate, calcium carbonate, calcium borate, zinc stearate, phthalate calcium, calcium hypophosphite, zinc oxide, calcium silicate, magnesium silicate, magnesium borate, magnesium metaborate and calcium metaborate; oxide, basic carbonate, basic carbonate, basic hypophosphite and basic subsulfate of metal of 14 group of periodic table such as tin oxide, basic tin carbonate, tin stearate, basic tin phosphate, basic tin subsulfate, trilead tetroxide, silicon oxide, silicon stearate; zinc oxide, aluminum oxide, aluminum hydroxide and iron hydroxide; and combined metal hydroxide such as hydrotalcite. These acid acceptors can be used singly, or in combination of two more kinds.

In the composition, the amount of the acid acceptor is preferably from 0.01 to 0.15 parts by weight based on 100 parts by weight of EVA.

As the plasticizer, polybasic acid esters and polyhydric alcohol esters are generally employed although the plasticizer can be used without any restriction. Examples of the esters include dioctyl phthalate, dihexyladipate, triethylene glycol-di-2-ethylbutylate, butyl sebacate, tetraethylene glycol heptanoate and triethylene glycol dipelargonate. The plasticizer can be used singly, or in combination of two or more kinds. The content of the plasticizer is generally in an amount of not more than 5 parts by weight based on 100 parts by weight of EVA.

As the adhesion improver, a silane coupling agent can be used. Examples of the silane coupling agent include γ-chloropropylmethoxysilane, vinyltriethoxysilane, vinyltris(β-methoxyethoxy)silane, γ-methacryloxypropylmethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, vinyltrichlorosilane, γ-mercaptopropylmethoxysilane, γ-aminopropyltriethoxysilane, N-β-(aminoethyl)-γ-aminopropyltrimethoxysilane. The silane coupling agents can be used singly, or in combination of two more kinds. The content of the silane coupling agent is preferably in an amount of not more than 5 weight by part based on 100 parts by weight of EVA.

In addition, the composition may comprise an ultraviolet absorbent, a photostabilizer and an antioxidant additionally.

Examples of the ultraviolet absorbents include benzophenone-type ultraviolet absorbents such as 2-hydroxy-4-methoxybenzophenone, 2-hydroxy-4-n-dodecyloxybenzophenone, 2,4-dihydroxybenzophenone, 2,2'-dihydroxy-4-methoxybenzophenone, and 2-hydroxy-4-n-octoxybenzophenone. The content of the benzophenone-type ultraviolet absorbent preferably is in the range of 0.01 to 5 parts by weight based on 100 parts by weight of EVA.

A hindered amine photostabilizer can be used as the photostabilizer. Examples of the photostabilizers include LA-52, LA-57, LA-62, LA-63, LA-63p, LA-67 and LA-68 (all manufactured by ADEKA Co., Ltd.), Tinuvin 744, Tinuvin 770, Tinuvin 765, Tinuvin 144, Tinuvin 622LD, and CHIMASSORB 944LD (manufactured by Ciba Specialty Chemicals Co., Ltd.), and UV-3034 (manufactured by B. F. Goodrich). The photostabilizers can be each used singly, or in combination of two or more kinds. The content of the photostabilizer preferably is in the range of 0.01 to 5 parts by weight based on 100 parts by weight of EVA.

Examples of the antioxidants include hindered phenol-type antioxidants such as N,N'-hexan-1,6-diyl-bis(3-(3,5-di-tert-butyl-4-hydroxyphenyl)propionamide], phosphorus-type heat stabilizers, lactone-type heat stabilizers, vitamin E-type heat stabilizers and sulfur-type heat stabilizers.

[Intermediate Film for Laminated Glass]

The composition of the present invention enables formation of the intermediate film for laminated glass that restrains white spots from occurring by the permeation of moisture and water. The intermediate film can be formed by a conventional process for preparing sheet using the composition.

The intermediate film can be formed, for example, by forming the composition by film formation method using extrusion molding or calendaring. Otherwise, the intermediate film can be also formed by dissolving the composition with solvent to prepare a solution, applying the solution to an appropriate support by means of an appropriate coater, and then drying it to form a coated layer.

The ethylene-vinyl acetate copolymer added to the intermediate film is preferably cross-linked and cured depending on the type of the cross-link agent. As described below, the intermediate film is preferably cross-linked and cured after inserting it between the two transparent substrates. The intermediate film and the transparent substrates can be combined with each other by cross-linking and curing the intermediate film.

If the thickness of the intermediate film is too small, the penetration resistance of the laminated glass is apt to be reduced. If the thickness of the intermediate film is too large, the transparency of the laminated glass is apt to be reduced. Therefore, the thickness of the intermediate film preferably is in the range of 0.2 to 1.6 mm, in particular in the range of 0.3 to 1.3 mm.

[Laminated Glass]

The laminated glass can be obtained by inserting the intermediate film for laminated glass between two transparent substrates and combining with them. In the present invention, the "glass" of the laminated glass means a common transparent substrate, and thus, the "laminated glass" means the transparent substrates having at least an intermediate film bonded between them.

The laminated glass of the present invention has the excellent safety and security by using the intermediate film having the excellent penetration resistance. Therefore, the laminated glass can be used for the following uses: an inserted glass, a side window (door glass) and a rear glass in an automobile; a door glass of a door leaf for passenger to go in or out, a door glass for chamber, and a window glass in a railway vehicle (e.g., corridor train, express train, special train, sleeping car), a window glass and a door glass in constructions such as building, a showcase for display, and a glass of show window. The laminated glass is preferably employed as a side window, inserted glass for side window and rear glass in an automobile, and a window glass in a railway vehicle, especially as a side window and inserted glass for a door glass in an automobile.

[Transparent Substrate]

Examples of the transparent substrate used for the laminated glass include a glass plate such as silicate salt glass, inorganic glass plate and colorless transparent glass plate and a plastic film. Examples of the plastic films include polyethylene terephthalate (PET) film, polyethylene naphthalate (PEN) film and polyethylene butyrate film. Of them, PET film is particularly preferred.

Each component used for the laminated glass can be superposed in the following order, for example, transparent substrate/intermediate film/transparent substrate, and transparent substrate/intermediate film/polycarbonate/intermediate film/transparent substrate. As transparent substrates arranged on both sides of the intermediate film, the same transparent substrates or the different transparent substrates can be used.

The impact resistance, the penetration resistance and the transparency of the laminated glass can be adjusted so as to have an appropriate performance by using the glass plate and the plastic film as the transparent substrates. This laminated glass can be used preferably for automobiles, glass such as a window glass in constructions such as building or a showcase for display and a glass of show window.

In case the laminated glass including the plastic film as one of the transparent substrates is used for a side window or an inserted glass of an automobile, the thickness of the laminated glass need not to be the same as the thickness of the front glass. Therefore, the thickness of the plastic film is generally in the range of 0.02 to 2 mm, preferably in the range of 0.02 to 1.2 mm. The thicknesses of the intermediate film and the plastic film may be adjusted depending on the use application of the laminated glass.

In addition, in case the laminated glass is used for a film-reinforced glass, the thickness of the glass plate is different depending on the installation location. For example, in case the laminated glass is used for a side window or an inserted glass of an automobile, the thickness of the laminated glass need not to be the same as the thickness of the front glass. Therefore, the thickness of the glass plate is generally in the range of 0.1 to 10 mm, preferably in the range of 0.3 to 5 mm. The glass plate can be reinforced by chemical or thermal treatment.

In addition, the laminated glass including the two glass plates as two transparent substrates has excellent impact resistance and penetration resistance. Therefore, this laminated glass can be used for various use application using the laminated glass. This laminated glass is preferably used for the front glass of an automobile.

In the laminated glass of which two transparent substrates are the glass plates, the thickness of the glass plate is generally in the range of 0.5 to 10 mm, preferably in the range of 1 to 8 mm.

The laminated glass of the present invention is obtained preferably by inserting the intermediate film between the two transparent substrates, and then combining them. The laminated glass can be obtained by inserting the intermediate film between the two transparent substrates to obtain a laminated body having a sandwich structure, and then heating and pressing the laminated body after degassing to cross-link EVA comprised in the intermediate film.

The cross-linking is generally carried out by heating the laminated body at 100 to 150° C., especially about 130° C. for 10 minuets to 1 hour, especially 10 to 30 minuets. The cross-linking may be carried out after preliminary bounding at 80 to 120° C. The heating treatment is preferably carried out at about 130° C. for 10 to 30 minuets (atmosphere temperature). The cross-linked laminated body generally cooled at room temperature. The cooling is preferably conducted rapidly.

[Hard Coat Layer]

In case the plastic film is used as at least one of the transparent substrates in the laminated glass of the present invention, a hard coat layer can be formed on the surface of the plastic film.

The thickness of the hard coat layer is generally in the range of 1 to 50 μm, preferably in the range of 3 to 20 μm.

As the hard coat layer, a layer comprising synthetic resin such as ultraviolet curable resin and thermoplastic resin can be employed preferably. Examples of the synthetic resin include acrylic resin, epoxy resin, oxetane resin and melamine resin. From point of view of a surface hardness, durability and cure degree, the acrylic resin is preferred.

Examples of the acrylic resins include a homopolymer, for example, alkyl acrylate esters such as methyl acrylate, ethyl acrylate, butyl acrylate and hexyl acrylate, alkyl methacrylate esters such as methyl methacrylate, ethyl methacrylate, butyl methacrylate and hexyl methacrylate.

The hard coat layer can be prepared by applying a composition for preparing the hard coat layer comprising the synthetic resin or a monomer or oligomer of the synthetic resin, if desired an initiating reagent, solvent and additives to the plastic film, and drying, and then heating or irradiating with ultraviolet to cure the composition.

Examples of the monomer of the synthetic resin include methyl acrylate, ethyl acrylate, butyl acrylate, benzyl acrylate, cyclohexyl acetate, vinyl acetate, styrene, ethyleneglycol diacrylate, propyleneglycol diacrylate, divinylbenzene, 1,4-cyclohexane diacrylate, 1,4-cyclohexyldimethyl diacrylate, trimethylolpropane triacrylate and pentaerythritol tetraacrylate.

As the initiating reagent, a photopolymerization initiator such as benzoin, benzoin derivative, acetophenone, benzophenone, hydroxybenzophenone, Michler's ketone, α-amyloxim ester, thioxanthone and derivatives thereof can be employed.

In the laminated glass of the present invention, the hard coat layer can be prepared on the laminated glass after preparing the laminated glass using the transparent substrate and the intermediate film. On the other hand, the composition for preparing the hard coat layer may be applied to a laminated body obtained by stacking the transparent substrates and the intermediate film, and heated or exposed to ultraviolet. Then, the laminated glass having the hard coat layer can be obtained by pressing the laminated body with heating to provide the hard coat layer and cross-rink the intermediate film.

The hard coat layer comprises the synthetic resin as a major component. The hard coat layer having various performances can be obtained by further using modified oligomer and monomer, or other functional resin and additives. Examples of the performance of the hard coat layer include abrasion-resistance, antifogging property, conductive property, antistatic property, gloss property, solvent resistance and low moisture permeability. Depending on the use application, at least two of the hard coat layer can be employed. In addition, the only one hard coat layer can be employed.

A transparent conductive layer composed of metal or metal oxide can be prepared on the surface of the glass plate used as the transparent substrate of the laminated glass. In addition, a barrier layer can be prepared on the side of the laminated glass. The thickness of the barrier layer is generally in the range of 0.1 to 20 μm, preferably 1 to 10 μm.

EXAMPLE

The preset invention is illustrated in detail below using the following Examples.

Example 1

1. Preparation of a Composition for Forming an Intermediate Film for a Laminated Glass 100 parts by weight of EVA (the content of vinyl acetate recurring unit is 25 parts by weight based on 100 parts by weight of EVA), 2.5 parts by weight of cross-linking agent, 2 parts by weight of cross-linking auxiliary, 0.5 parts by weight of silane coupling agent, 0.3 parts by weight of ultraviolet absorbing agent and 1 parts by weight of compound having alkylenoxy group were introduced into a roll-mill and kneaded at 80° C. to prepare a composition.

The cross-linking agent, the cross-linking auxiliary, the silane coupling agent, the ultraviolet absorbing agent and the compound having alkylenoxy group were employed as follows;
Cross-linking agent:
  t-butylperoxy-2-ethylhexylmonocarbonate
  (PERBUTYL® E, from NOF CORPORATION)
Cross-linking auxiliary:
  triallylisocyanurate
Silane coupling agent:
  3-methacryloxypropyl tri-methoxysilane
  (SZ6030, from Dow Corning Toray Co., Ltd.)
Ultraviolet absorbing agent:
  2,2'-dihydroxy-4,4'-dimethoxybenzophenone
  (Uvinul® 3049, from BASF Japan Ltd.)
Compound having alkylenoxy group:
  methoxy nonaethyleneglycol acrylate 2. Formation of an Intermediate Film for a Laminated Glass The composition for forming an intermediate film for a laminated glass prepared as mentioned above was formed by calendaring at 90° C., and then cooled to provide an intermediate film (thickness 0.4 mm) for a laminated glass.

3. Manufacture of a Laminated Glass

The intermediate film for the laminated glass was inserted between two glass plates (thickness 3 mm) to provide a laminated body. The laminated body was preliminary bonded at 100° C. under pressure, and then introduced into an autoclave and heated at 140° C. for 30 minutes under a pressure of $13 \times 10^5$ Pa to provide a laminated glass.

Examples 2-8 and Comparative Example 1

The compositions for forming an intermediate film and the laminated glass using it were prepared by repeating the procedures of Example 1 except for using other compounds having alkylenoxy group. The types and contents of the compounds having alkylenoxy group were described in the table 1.

In addition, in examples 6 and 7, 2-hydroxyethyl acrylate was further used in the amount described in the table 1.

[Evaluation of Durability]

The laminated glass prepared as mentioned above was allowed to stand under environment of temperature of 121° C. and humidity of 100% RH for 200 hours. Before and after the standing, the Haze value of the laminated glass was measured according to JIS K 7105 (1981) using an automatic direct reading haze computer (HGM-2DP, available from SUGA Test. Instruments Co., Ltd.). The obtained results were shown in table 1.

TABLE 1

| | Compound having alkylenoxy group | Content | Haze value Before | Haze value After |
|---|---|---|---|---|
| Example 1 | methoxy nonaethyleneglycol acrylate | 1 | 0.50 | 19.96 |
| Example 2 | ethoxy diethyleneglycol acrylate | 1 | 0.53 | 30.03 |
| Example 3 | glycerin dimethacrylate | 1 | 0.48 | 31.45 |
| Example 4 | tripropyleneglycol diacrylate | 1 | 0.55 | 34.09 |
| Example 5 | 2-hydroxyethyl acrylate | 1 | 0.44 | 26.52 |
| Example 6 | methoynonaethyleneglycol acrylate | 1 | 0.35 | 12.75 |
| | (2-hydroxyethyl acrylate | 0.5) | | |
| Example 7 | methoynonaethyleneglycol acrylate | 1 | 0.36 | 5.65 |
| | (2-hydroxyethyl acrylate | 1) | | |
| Example 8 | methoynonaethyleneglycol acrylate | 5.1 | 0.35 | 10.2 |
| Comparative example 1 | none | 0 | 0.56 | 46.43 |

The invention claimed is:

1. A composition for forming an intermediate film for a laminated glass comprising an ethylene-vinyl acetate copolymer and a compound having an alkyleneoxy group, wherein the compound having an alkyleneoxy group has the following formula (1):

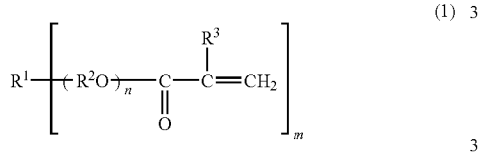

(1)

in which $R^2$ represents an alkylene group that is not substituted or an alkylene group that is substituted by a methyl group, an ethyl group, a propyl group, an isopropyl group, a butyl group, a tert-butyl group, a pentyl group, a neopentyl group or a hexyl group, $R^3$ represents a hydrogen atom or a methyl group, n is an integer of from 2 to 30, m is 1, $R^1$ is an alkoxyl group or an aryloxy group.

2. The composition for forming an intermediate film for a laminated glass as defined in claim 1, wherein $R^2$ represents an ethylene group or —$CH_2CH(CH_3)$—.

3. The composition for forming an intermediate film for a laminated glass as defined in claim 1, wherein n is an integer of from 2 to 20.

4. The composition for forming an intermediate film for a laminated glass as defined in claim 1, wherein $R^1$ is an alkoxyl group having 1 to 10 carbon atoms or an aryloxy group having 6 to 20 carbon atoms.

5. The composition for forming an intermediate film for a laminated glass as defined in claim 1, wherein the compound having an alkyleneoxy group is methoxy polyethyleneglycol (meth)acrylate (n=4 to 15).

6. The composition for forming an intermediate film for a laminated glass as defined in claim 1, wherein the compound having an alkyleneoxy group is contained in the amount of 0.01 to 5 parts by weight based on 100 parts by weight of the ethylene-vinyl acetate copolymer.

7. The composition for forming an intermediate film for a laminated glass as defined in claim 1, which further comprises 2-hydroxyethyl acrylate.

8. The composition for forming an intermediate film for a laminated glass as defined in claim 7, wherein 2-hydroxyethyl acrylate is contained in an amount in the range of 0.01 to 5 parts by weight based on 100 parts by weight of the ethylene-vinyl acetate copolymer.

9. The composition for forming an intermediate film for a laminated glass as defined in claim 1, the content of vinyl acetate recurring unit of the ethylene-vinyl acetate copolymer is in the range of 20 to 35 parts by weight based on 100 parts by weight of ethylene-vinyl acetate copolymer.

10. An intermediate film for a laminated glass obtained by molding in the form of a sheet the composition for forming an intermediate film for a laminated glass as defined in claim 1.

11. A laminated glass obtained by inserting the intermediate film for laminated glass as defined in claim 10 between two transparent substrates to be cross-linked and combined with each other.

* * * * *